United States Patent [19]

Denzinger et al.

[11] Patent Number: 4,621,127

[45] Date of Patent: Nov. 4, 1986

[54] PREPARATION OF CARBOXYL-CONTAINING POLYMERS

[75] Inventors: Walter Denzinger, Speyer; Heinrich Hartmann, Limburgerhof; Johannes Perner, Neustadt; Hans-Juergen Raubenheimer, Ketsch, all of Fed. Rep. of Germany

[73] Assignee: BASF Aktiengesellschaft, Rheinland-Pfalz, Fed. Rep. of Germany

[21] Appl. No.: 777,328

[22] Filed: Sep. 18, 1985

[30] Foreign Application Priority Data

Sep. 18, 1984 [DE] Fed. Rep. of Germany ....... 3434139

[51] Int. Cl.$^4$ ............................................. C08F 22/04
[52] U.S. Cl. ..................................... 526/193; 526/233
[58] Field of Search ................................ 526/193, 233

[56] References Cited

U.S. PATENT DOCUMENTS

| | | | |
|---|---|---|---|
| 2,789,099 | 4/1957 | Rife | 526/233 |
| 3,635,915 | 1/1972 | Gale | 260/78.5 R |
| 3,755,282 | 8/1973 | Wright | 526/233 |
| 4,375,533 | 3/1983 | Park | 526/193 |

Primary Examiner—Paul R. Michl
Attorney, Agent, or Firm—Oblon, Fisher, Spivak, McClelland & Maier

[57] ABSTRACT

Carboxyl-containing polymers which are water-soluble at least in the neutralized form are prepared by a method in which a monoethylenically unsaturated $C_3$–$C_5$-carboxylic acid is polymerized in the presence or absence of a carboxyl-free copolymerizable ethylenically unsaturated monomer in aqueous solution in the presence of polymerization initiator and of from 0.01 to 5% by weight, based on the monomers, of an inorganic acid of phosphorus in which the phosphorus has an oxidation state of from 1 to 4, its water-soluble salts, a water-soluble —$PO(OH)_2$-containing compound and/or its water-soluble salts and, if required, a polymerization regulator. Virtually colorless or only slightly colored polymer solutions are obtained.

14 Claims, No Drawings

PREPARATION OF CARBOXYL-CONTAINING POLYMERS

It is known that ethylenically unsaturated carboxylic acids, such as acrylic acid, methacrylic acid and maleic acid, can be polymerized in aqueous solution using a polymerization initiator, in the presence or absence of other ethylenically unsaturated, copolymerizable monomers. Depending on the composition of the polymers, they are soluble in water in the form of the free acids or in partially or completely neutralized form. The polymer solutions prepared on a large industrial scale by the conventional solution polymerization methods are more or less strongly colored, and the range of use of these products is therefore restricted.

U.S. Pat. No. 3,635,915 discloses that such discoloration of the polymer solutions can be avoided by carrying out the polymerization in the presence of sodium bisulfite. However, the presence of sodium bisulfite during the polymerization affects the course of the latter to such an extent that problems may arise with regard to the removal of heat. Furthermore, German Laid-Open Application DOS No. 2,556,258 discloses that aqueous polymer solutions can be treated with sodium borohydride in order to lighten them. However, an additional process step increases the production costs for the polymer solution.

It is an object of the present invention to provide a process for the preparation of carboxyl-containing polymers, which are water-soluble at least in the neutralized form, by polymerization of a monoethylenically unsaturated $C_3$-$C_5$-carboxylic acid in the presence or absence of carboxyl-free copolymerizable ethylenically unsaturated monomers in aqueous solution using a polimerization initiator, in which colorless or only slightly colored aqueous polymer solutions are obtained.

We have found that this object is achieved, in accordance with the invention, if the polymerization is carried out in the presence of from 0.01 to 5% by weight, based on the monomers, of an inorganic acid of phosphorus in which the phosphorus has an oxidation state of from 1 to 4, its water-soluble salts, a water-soluble —$PO(OH)_2$-containing compound and/or its water-soluble salts.

In the novel process, colorless or only slightly colored polymer solutions are obtained by polymerizing a monoethylenically unsaturated $C_3$-$C_5$-carboxylic acid under the conditions stated above. Both monocarboxylic and dicarboxylic acids are suitable, e.g. acrylic acid, methacrylic acid, crotonic acid, vinyl lactic acid, maleic acid, fumaric acid, aconitic acid, itaconic acid, mesaconic acid, citraconic acid and methylenemalonic acid. Homopolymers of acrylic acid, methacrylic acid, maleic acid or itaconic acid and copolymers of acrylic acid and methacrylic acid, of acrylic acid and maleic acid, of acrylic acid and itaconic acid, of methacrylic acid and maleic acid and of methacrylic acid and itaconic acid are preferably prepared. The stated carboxylic acids can be copolymerized with one another in any ratio. Instead of two of the stated carboxylic acids, it is also possible to copolymerize three or four different carboxylic acids with one another.

The stated carboxylic acids can be subjected to the polymerization in the presence or absence of carboxyl-free copolymerizable ethylenically unsaturated monomers. Examples of suitable comonomers, whose use in the polymerization depends on the solubility of the resulting copolymer, are amides, nitriles and esters of ethylenically unsaturated $C_3$-$C_5$-carboxylic acids, eg. acrylamide, methacrylamide, methyl acrylate, methyl methacrylate, ethyl acrylate, ethyl methacrylate, hydroxyethyl acrylate, hydroxyethyl methacry-late, hydroxypropyl acrylate, hydroxypropyl methacrylate, butane-1,4-diol monoacrylate, butane-1,4-diol monomethacrylate, dimethylaminoethyl acrylate, dimethylaminoethyl methacrylate, diethylaminoethyl acrylate or diethylaminoethyl methacrylate, vinyl esters, eg. vinyl acetate, vinyl propionate or vinyl butyrate, and 2-acrylamido-2-methylpropanesulfonic acid, vinylsulfonic acid, allylsulfonic acid, vinylglycol, allyl alcohol, ethylene, propylene, styrene, methylstyrene and butadiene. Among the stated monomers, those which are preferably used are vinyl acetate, diethylaminoethyl acrylate, dimethylaminoethyl acrylate, hydroxyethyl methacrylate, hydroxypropyl methacrylate and methyl acrylate. The basic acrylates, such as dimethylaminoethyl acrylate, are used in the form of either the salts or the quaternized compounds, eg. compounds quaternized with benzyl chloride or methyl chloride. This group of comonomers serves for modifying the carboxyl-containing polymers, the copolymers containing from 0 to 40% by weight of such comonomers.

The monomers are polymerized in aqueous solution using a polymerization initiator, preferably a water-soluble initiator, eg. sodium persulfate, potassium persulfate, ammonium persulfate, hydrogen peroxide, azobis(2-aminopropane) hyrochloride, 2,2'-azobis(N,N'-dimethyleneisobutyramidine) dihydrochloride or 2,2'-azobis(4-cyanopentanoic acid). The initiators are used either alone or as a mixture, eg. a mixture of hydrogen peroxide and sodium persulfate. In addition to the water-soluble initiators, it is also possible to use organic peroxides, hydroperoxides and azo compounds, which are only slightly soluble in water. Examples are tert.-butyl perpivalate, 2,2'-azobis(valeronitrile), tert.-butyl per-2-ethylhexanoate, 2,2'-azobisisobotyronitrile, tert.-butyl perbenzoate, tert.-butyl hydroperoxide and p-menthane hydroperoxide. The monomers may also be polymerized using a redox catalyst. To do this, a reducing agent such as ascorbic acid, benzoin or dimethylaniline is used, if necessary together with a soluble complex or salt of a heavy metal. It is known that this makes it possible to effect the polymerization at a lower temperature. The polymerization is carried out at from 60° to 160° C., preferably from 80° to 130° C. At above 100° C., it is of course necessary to carry out the polymerization under superatmospheric pressure. The concentrations of monomers in the aqueous solutions are from 20 to 70, preferably from 35 to 60% by weight.

In order to prepare polymers having different molecular weights, the conventional chain-terminating substances, eg. formic acid, hydroxylamine (as the sulfate or chloride) or SH-containing compounds such as thioglycolic acid, thiopropionic acid, mercaptoethanol or thiomaleic acid are used as molecular weight regulators. Other examples of polymerization regulators are allyl alcohol and butenol. Where polymerization regulators are required, they are used in amounts as high as 20% by weight, based on the monomers. Preferably, polymerization is effected in the presence of from 0.5 to 15% by weight, based on the monomers, of an SH-containing polymerization regulator.

In order to obtain colorless or only slightly colored polymer solutions, the polymerization is carried out in the presence of an inorganic acid of phosphorus in which the phosphorus has an oxidation state of from 1 to 4, its water-soluble salts, a water-soluble —PO(OH)$_2$-containing compound and/or its water-soluble salts. Examples of suitable water-soluble inorganic phosphorus compounds are hypophosphorous acid and its sodium and potassium salts, hypodiphosphorous acid, sodium hypodiphosphite, phosphorous acid and monosodium phosphite and disodium phosphite, diphosphorous acid and sodium diphosphite, hypodiphosphorous acid and sodium hypodiphosphate. Among this group of inorganic phosphorus compounds, phosphorous acid and its sodium, potassium and ammonium salts are preferably used.

Water-soluble —PO(OH)$_2$-containing compounds may also be referred to as organophosphonic acids of which the following compounds may be mentioned as examples: methane-diphosphonic acid, propane-1,2,3-triphosphonic acid, butane-1,2,3-tetraphosphonic acid, polyvinylphosphonic acid, 1-aminoethane-1,1-diphosphonic acid, 1-amino-1-phenyl-1,-diphosphonic acid, aminotrismethylenetriphosphonic acid, methylamino- or ethylaminobismethylenediphosphonic acid, ethylenediaminoetetramethylenetetraphosphonic acid, ethylenetriaminopentamethylenepentaphosphonic acid, 1-hydroxyethane-1,1-diphosphonic acid, phosphonoacetic and phosphonopropionic acid and their salts, 1-hydroxy-1,1-diphosphonic acid, its disodium and tetrasodium salts, aminotrismethylenetriphosphonic acid and the pentasodium salt and ethylenediaminotetramethylenetetraphosphonic acid and its salts being preferred. It is often advantageous to combine several phosphorus compounds, for example sodium hypophosphite and phosphorous acid, phosphorous acid and disodium 1-hydroxyethylidene-1,1-diphosphonate, and aminotrimethylenetriphosphonic acid and 1-hydroxyethane-1,1-diphosphonic acid. They may be mixed with one another in any ratio and used in the polymerization.

The amounts added are from 0.01 to 5, particularly preferably from 0.1 to 1, % by weight, based on monomers employed.

In preparing aqueous solutions of homopolymers, the following procedure is adopted: water and a small amount of the monomers (from 2 to 5% of the amount of monomers to be polymerized) are initially taken in the reactor, the mixture is flushed with nitrogen and the reactor content is heated to the desired polymerization temperature. The remaining amount of the monomers, the initiator, dissolved in water, and, if required, the molecular weight regulator are introduced into the reactor in the course of from 1 to 10, preferably from 2 to 8, hours. The phosphorus compounds are preferably initially taken in the reactor but may also be fed into the reactor in the aqueous monomer solution or separately from this. In some cases, this is advantageous if about 10% of the phosphorus compounds is initially taken in the reactor and the remainder added continuously with the monomers.

In the copolymerization of several monomers, particularly when monoethylenically unsaturated dicarboxylic acids are used, it is advantageous if the dicarboxylic acid is initially taken in the reactor and the remaining monomers, the initiator and, if required, the molecular weight regulator are metered in over a fairly long period. As described in the case of the homopolymerization, either the phosphorus compound can be initially taken in the reactor or some of it can be initially taken and the remainder metered in with the monomers. The ethylenically unsaturated carboxylic acids may be subjected to the polymerization either in the form of the free acid or in the completely or partially neutralized form. In a preferred embodiment, from 20 to 80%, preferably from 30 to 70%, of the carboxyl groups of the monomers are neutralized with alkali, preferably with sodium hydroxide. Where the carboxyl-free monomers are used for modifying the carboxyl-containing polymers, the carboxyl-free monomers are either initially taken in the reactor or metered in as a mixture with the carboxyl-containing monomers or separated from these.

The polymers prepared in this manner have K values (measured according to H. Fikentscher) of from 8 to 200, preferably from 12 to 60 (measured on a 2% strength by weight solution of the sodium salt of the polymer in water at pH 7.0–7.5 and 25° C.). The K values of from 8 to 200 correspond to weight average molecular weights of from 500 to 1,000,000, and the K values from 12 to 60 correspond to molecular weights of from 1,000 to 100,000, measured with the aid of gel permeation chromatography.

The aqueous polymer solutions prepared by the novel process are colorless or only slightly colored and can be used directly or in partially or completely neutralized form (neutralization may also be effected when the polymerization is complete) for a very wide variety of applications for which these polymers have been used to date, for example as encrustation inhibitors, antiredeposition agents and dispersants in the detergent sector, for preventing scaling in kettles (scale inhibitors) and as dispersants for paper-coating pigments. Polymers which are particularly useful as dispersants for paper-coating pigments are those which have K values of from 12 to 30.

In the Examples, parts are by weight unless stated otherwise. The K values were measured according to H. Fikentscher, Cellulosechemie 13 (1932), 58–64 and 71–74, in aqueous solution at 25° C. and at a polymer concentration of 2% by weight; $K = k \cdot 10^3$. The pH during the measurement was from 7.0 to 7.5.

The molecular weights were determined by gel permeation chromatography (GPC) using aqueous eluents. The separation columns were calibrated using polystyrene sulfonates from Pressure Chem. Comp. having a narrow distribution, and converting to the molar mass units of Na polyacrylate according to the universal calibration principle of BENOIT (J. Chim. Phys. 63 (1966), 1507) using the measured data of SpATORICO and BEYER (J. Appl. Polym. Sci. 19 (1975), 2933). This calculation was also applied to the copolymers.

The color of the aqueous polymer solutions was determined by measuring the transmittance of the aqueous polymer solutions diluted to 10% by weight with water. The transmittance was measured in a spectrophotometer at a wavelength of 400 nm in a cell having a diameter of 10 mm, the transmittance of water being taken as 100%.

EXAMPLES 1 TO 4

1,040 parts of water, 50 parts of acrylic acid and 2 parts of a 50% strength aqueous phosphorous acid were initially taken in a stainless steel reactor which had a capacity of 6 l and was equipped with a stirrer, and the mixture was heated to 80° C. in a gentle stream of nitrogen. Three different feeds were prepared, the first feed consisting of 2,000 parts of acrylic acid, 205 parts of thioglycolic acid and 250 parts of water, the second consisting of a solution of 60 parts of ammonium persulfate and 300 parts of water, and the third consisting of an aqueous solution of 2 g of azobis(2-aminopropane) hydrochloride in 50 parts of water. The three feeds were introduced into the reactor contents separately from one another in the course of 4 hours. The polymerization was carried out during this time at 80° C.; when the addition was complete, the reaction mixture was polymerized for a further 1½ hours at 100° C., cooled to 60° C. and then neutralized with 1,350 parts of 50% strength aqueous sodium hydroxide solution. The K value of the polymer was 18, corresponding to a molecular weight of 2,500. The transmittance of an aqueous polymer solution diluted to a solids content of 10% was 91%.

EXAMPLES 2 TO 4

Example 1 was repeated, except that in each case the phosphorus compounds shown in Table 1 were initially taken for the polymerization. The K value of the polymers prepared in this manner was 18 in each case, corresponding to a molecular weight of 2,500. Table 1 shows the phosphorus compound employed in each case and the transmittance of aqueous polymer solutions diluted to a solids content of 10%.

COMPARATIVE EXAMPLE 1

Example 1 was repeated, except that the procedure was carried out in the absence of phosphorous acid. Although the resulting polymer likewise had a K value of 18 (molecular weight 2,500), the transmittance of a 10% aqueous polymer solution was 35%.

TABLE 1

| | Parts | Phosphorus compound added | Transmittance of the 10% strength aqueous polymer solution [%] |
|---|---|---|---|
| Example | | | |
| 1 | 12 | phosphorous acid, 50% strength | 91 |
| 2 | 24 | phosphorous acid, 50% strength | 95 |
| 3 | 20 | sodium hypophosphite ($NaPH_2O_2.H_2O$) | 92 |
| 4 | 10 | pentasodium aminotris-methylenetriphosphonate | 98 |

TABLE 1-continued

| | Parts | Phosphorus compound added | Transmittance of the 10% strength aqueous polymer solution [%] |
|---|---|---|---|
| Comparative Example 1 | | — — | 35 |

EXAMPLES 5 TO 15

1,070 parts of water, 823.3 parts of maleic acid and the phosphorus compound stated in each case in Table 2 were initially taken in a stainless steel reactor which had a capacity of 8 l, was equipped with a stirrer and was suitable for operation under superatmospheric pressure. The reactor was then closed, nitrogen was forced in until the pressure reached 4 bar, this procedure being repeated 3 times, and the reactor contents were then heated to 120° C. under superatmospheric pressure. A thoroughly cooled solution of 2,273 parts of acrylic acid, 649 parts of 30% strength hydrogen peroxide and 1,000 parts of water was then introduced uniformly in the course of 8 hours, after which the reaction mixture was heated at 120° C. for a further hour, cooled to 50° C. and then neutralized with 3,380 parts of 50% strength aqueous sodium hydroxide solution. The K value of the copolymers thus obtained was 30, corresponding to a molecular weight of 20,000.

COMPARATIVE EXAMPLE 2

Example 5 was repeated, except that the procedure was carried out in the absence of a phosphorus compound. The resulting polymer solution had a K value of 30 (molecular weight 20,000). The transmittance was 41%, measured on a 10% strength aqueous polymer solution.

COMPARATIVE EXAMPLE 3

Example 5 was repeated, except that sodium hypophosphite was replaced with the same amount of tetrasodium ethylenediaminetetraacetate. The K value (2% strength in water) was 30, corresponding to a molecular weight of 20,000.

| | Parts | Phosphorus compound added | Transmittance of the 10% strength aqueous polymer solution [%] |
|---|---|---|---|
| Example | | | |
| 5 | 30 | sodium hypophosphite | 76 |
| 6 | 150 | sodium hypophosphite | 88 |
| 7 | 60 | phosphorous acid, 50% strength | 89 |
| 8 | 30 | phosphorous acid, 50% strength | 81 |
| 9 | 30 | ethylenediaminotetra-methylenetetraphosphonic acid | 96 |
| 10 | 6 | ethylenediaminotetra-methylenetetraphosphonic acid | 95 |
| 11 | 3 | ethylenediaminotetra-methylenetetraphosphonic acid | 93.5 |
| 12 | 3 | 1-hydroxyethane-1,1-diphosphonic acid | 94 |
| 13 | 1.5 | 1-hydroxyethane-1,1- | 96 |

-continued

| | Parts | Phosphorus compound added | | Transmittance of the 10% strength aqueous polymer solution [%] |
|---|---|---|---|---|
| | | diphosphonic acid | | |
| | 1.5 | aminotrismethylenetri- | | mixture |
| | | phosphonic acid | | |
| 14 | 10 | sodium hypophosphite | mixture | 85 |
| | 20 | phosphorous acid, 50% strength | | |
| 15 | 6 | ethylenetriaminopenta-methylenepentaphosphonic acid | | 95 |
| Comparative Example | | | | |
| 2 | — | — | | 41 |
| 3 | 30 | tetrasodium ethylene-diaminetetraacetate | | 35 |

EXAMPLES 16 TO 21 transmittance of 10% strength aqueous polymer solutions are likewise shown in Table 3.

TABLE 3

| Example | Monomer I [parts] | Sodium hydroxide solution [parts] | Monomer II [parts] | Initiator [parts] | Regulator [parts] | P compound [parts] | K value | Molecular weight | Transmittance [%] |
|---|---|---|---|---|---|---|---|---|---|
| 16 | 96 AS | — | 3000 AS | 60 $Na_2S_2O_8$ | 60 ME | 30 phosphorous acid, 50% strength | 29 | 10,000 | 98 |
| 17 | 823 IS | 912 | 2273 AS | 240 $H_2O_2$, 50% strength | — | 30 phosphorous acid, 50% strength | 61 | 100,000 | 93 |
| 18 | 96 MAS | — | 3000 MAS | 60 $Na_2S_2O_8$ | 90 ME | 30 phosphorous acid, 50% strength | 22 | 5,000 | 97 |
| 19 | 823 MS | 930 | 1000 HEA 1273 AS | 240 $H_2O_2$, 50% strength | — | 6 1-hydroxyethane-1,1-diphosphonic acid | 36 | 30,000 | 93 |
| 20 | 48 AS 48 MAS | — | 1500 AS 1500 MAS | 45 $Na_2S_2O_8$ | 90 ME | 6 1-hydroxyethane-1,1-diphosphonic acid | 19 | 4,000 | 91 |
| 21 | 1096 MS | 960 | 1500 AS 500 VAc strength 500 MA 500 DEAEA | 240 $H_2O_2$, 50% | — | 15 phosphorous acid, 50% strength 6 1-hydroxyethane-1,1-diphosphonic acid | 39 | 40,000 | 92 |

AS: Acrylic acid
MAS: Methacrylic acid
MS: Maleic acid
IS: Itaconic acid
HEA: Hydroxyethyl acrylate
VAc: Vinyl acetate
MA: Methyl acrylate
DEAEA: Diethylaminoethyl acrylate
ME: Mercaptoethanol These Examples were carried out in a stainless steel reactor which had a capacity of 8 l and was provided with a stirrer, a reflux condenser, an apparatus for working under nitrogen and a feed. 1070 parts of water and the substances shown in Table 3 under monomer I and, if required, 50% strength aqueous sodium hydroxide solution were initially taken in each case and the mixture was heated at the boil at 100° C., after which the compounds stated under monomer II, separately from this an aqueous solution of the initiator stated in Table 3, in 500 parts of water, and independently of this a solution of the polymerization regulator and of a phosphorus compound, each of which is shown in Table 3 and was used in solution in 500 parts of water, were added continuously in the course of 5 hours. The reaction mixture was then heated at the boil for a further 2 hours, after which it was cooled. The K values of the polymers, the corresponding molecular weights and the

We claim:

1. A process for the preparation of a carboxyl-containing polymer which is water soluble, at least in the neutralized form, which comprises: polymerizing a monoethylenically unsaturated $C_3$–$C_5$-carboxylic acid and from 0–40 percent by weight of a carboxyl group-free copolymerizable ethylenically unsaturated monomer in an aqueous solution which contains a polymerization initiator and from 0.01 to 5 percent by weight based on the monomer, of a compound which is selected from the group consisting of hypodiphosphorous acid, hypodiphosphorous acid salts, phosphorous acid, phosphorous acid salts, diphosphorous acid, diphosphorous acid salts, water soluble —$PO(OH)_2$-containing compounds, water-soluble salts thereof and mixtures thereof at a temperature of no more than 160° C.

2. The process of claim 1, wherein said carboxyl group-free copolymerizable ethylenically unsaturated monomer is an amide, nitrile or ester of an ethylenically unsaturated $C_3$–$C_5$-carboxylic acid, a vinyl ester, 2-acrylamido-2-methylpropanesulfonic acid, vinyl sulfonic acid, allyl sulfonic acid, vinyl glycol, allyl alcohol, ethylene, propylene, styrene, methylstyrene or butadiene.

3. The process of claim 1, wherein said compound is phosphorous acid or a salt thereof.

4. The process of claim 1, wherein said water-soluble —$PO(OH)_2$ containing compound is a member selected from the group consisting pentasodium aminotrismethylenetriphosphonate, ethylenediaminotetramethylenetetra phosphonic acid, ethylenetriaminopentamethylene phosphoric acid and 1hydroxethane-1,1-diphosphonic acid.

5. The process of claim 1, wherein the carboxylic acid monomer is acrylic acid, methacrylic acid, maleic acid or itaconic acid.

6. The process of claim 1, wherein said polymerization reaction is conducted by copolymerizing acrylic acid with methacrylic acid, acrylic acid with maleic acid, or acrylic acid with itaconic acid.

7. The process of claim 1, wherein said polymerization reaction is conducted in the presence of from 0.5 to 15 percent by weight, based on the monomers, of an SH containing polymerization regulator.

8. The process of claim 1, wherein said polymerization reaction is conducted at a temperature ranging from 80° to 130° C.

9. The process of claim 1, wherein the concentration of reacting monomer in the aqueous polymerization medium ranges from 20 to 70 percent by weight.

10. The process of claim 9, wherein the concentration of reacting monomer in the aqueous solution ranges from 35 to 60 percent by weight.

11. The process of claim 1, wherein said monoethylenically unsaturated $C_3$–$C_5$ carboxylic acid monomer is polymerized in the state of being from 20 to 80 percent neutralized with an alkali reagent.

12. The process of claim 11, wherein the extent of neutralization ranges from 30 to 70 percent.

13. The process of claim 1, wherein the polymer product prepared by said process has a K value ranging from 8 to 200.

14. A process for the preparation of a carboxyl-containing polymer which is water-soluble, at least in the neutralized form, which comprises:
polymerizing a monoethylenically unsaturated $C_3$–$C_5$ carboxylic acid and from 0–40% by weight of a carboxyl group-free copolymerizable ethylenically unsaturated monomer in an aqueous solution which contains a polymerization initiator and from 0.01 to 5% by weight, based on the monomer, of phosphorous acid, a water-soluble salt thereof, a water-soluble —$PO(OH)_2$-containing compound, a water-soluble salt thereof or a mixture thereof, at a temperature of no more than 160° C.

* * * * *